United States Patent
Kurosawa

Patent Number: 5,870,638
Date of Patent: Feb. 9, 1999

[54] CAMERA HAVING TWO OPERATIVE MODES

[75] Inventor: Yuichi Kurosawa, Tokyo, Japan

[73] Assignee: Asahi Kogaku Kogyo Kabushiki Kaisha, Tokyo, Japan

[21] Appl. No.: 921,465

[22] Filed: Sep. 2, 1997

[30] Foreign Application Priority Data

Sep. 3, 1996 [JP] Japan ................................. 8-232808
Jul. 14, 1997 [JP] Japan ................................. 9-187088

[51] Int. Cl.⁶ ............................................. G03B 17/24
[52] U.S. Cl. .......................... 396/267; 396/429; 396/440
[58] Field of Search .................................. 396/429, 267, 396/446, 440

[56] References Cited

U.S. PATENT DOCUMENTS 4,348,086  9/1982  Forscher ..................................... 396/30
4,531,818  7/1985  Bally ........................................... 396/30

FOREIGN PATENT DOCUMENTS 2101874  4/1990  Japan.

Primary Examiner—David M. Gray
Attorney, Agent, or Firm—Greenblum & Bernstein, P.L.C.

[57] ABSTRACT

A camera includes an imaging device having an image receiving plane, the imaging device receiving an optical image formed on the image receiving plane and outputting signal corresponding to the received image, and a pressure plate arranged between a photographing lens and the imaging device, the pressure plate being formed of a transparent plate member having a predetermined gradient distribution of refractive index, the pressure plate shifting an image formed in front of the pressure plate to the imaging device.

12 Claims, 11 Drawing Sheets

CAMERA HAVING TWO OPERATIVE MODES

BACKGROUND OF THE INVENTION

The present invention relates to a camera which is operable in two operative modes: a normal photographing mode using a photographing film; and a digital photographing mode using an imaging device such as a CCD (Charge Coupled Device) instead of the photographing film.

Recently, imaging devices, such as CCDs, have improved greatly. In particular, the density of image pixels, i.e., the number of pixels per unit "area", has been increased such that the quality of captured images has improved greatly. Digital cameras using such imaging devices have been developed.

On the other hand, in normal photography, a new film system called "APS" (Advanced Photographing System) has been developed which makes normal photographing easier.

In order to make use of the advantages of both the normal photographing and the digital photographing systems, a camera operable in the normal photographing mode and the digital photographing mode has been developed. An example of such a camera is provided with a half mirror on an optical axis of a photographing lens. The half mirror splits an incident light into two light rays: one is directed towards the photographing film; the other is directed to the imaging device.

In such a camera, since the light converged by a lens system is split into two rays, the amount of light incident to the photographing film or the imaging device is reduced to one-half in comparison to a camera which is operable only in only one mode (digital or normal). Since recent cameras are designed to have a small diameter photographing lens, this reduction in the amount of light incident to the film or the imaging device becomes a problem.

One method of avoiding the above problem is to have a light path switching mechanism. For example, a total reflecting mirror may be inserted in or retracted from the light path, such that the path is switched, so that the light is incident on either the photographing film or the imaging device.

However, such a light path switching mechanism will require space, and as such, a camera including such a mechanism must be relatively large to have sufficient room for accommodating the mechanism. Further, the structure may be very complicated and increase manufacturing cost.

Japan Patent Provisional Publication HEI 2-101874 discloses a camera which is switchable between the normal photographing mode or the digital photographing mode with a relatively simple structure. In particular, a pressure plate at the rear of the camera is provided with a transparent window member, and an imaging device is arranged behind the transparent window member. In this camera, when the photographing film is loaded in the camera, the normal photographing is executed, while when the photographing film is not loaded in the camera, the digital photographing can be executed. That is, when the film is not loaded, the image focused by a photographing lens is transmitted to the imaging device through the transparent window member. Note that according to this system, the light amount is the same for both the normal and digital photographing.

In the camera described above, the structure requires that a film surface and an image receiving surface of the imaging device are at different distances from the lens with the transparent member located therebetween. In order to obtain an in-focus image in either mode, the image must be focused at different positions depending on the mode. In other words, a focusing operation must be performed that compensates for the difference between the image receiving planes, i.e., the postions of the two film and the image receiving surface of the imaging device. The above publication discloses a structure for automatically switching focusing operations in accordance with a selected operation mode. In order to perform focusing operations with respect to both of the different positions, a detector for detecting a focusing status of one of the positions and/or a logic circuit for performing a focus calculation is used for each focusing position, which duplicates the number of focus detecting systems or complicates the logic of the logic circuit, and as a result a price of the camera is increased.

SUMMARY OF THE INVENTION

It is therefore an object of the invention to provide an improved camera which has a normal photographing mode and a digital photographing mode.

According to an aspect of the present invention, there is provided, a camera, including an imaging device having an image receiving plane, the imaging device receiving an optical image formed on the image receiving plane and outputting signal corresponding to the received image, and a pressure plate arranged between a photographing lens and the imaging device, the pressure plate being formed of a transparent plate member having a predetermined gradient distribution of refractive index, the pressure plate shifting an image formed in front of the pressure plate to the imaging device.

In a particular case, the transparent plate member includes a resin plate having a maximum refractive index at a portion where an optical axis of the photographing lens intersects the resin plate and a refractive index of the resin plate being lower at a portion away from the portion where the optical axis intersects the resin plate.

In another particular case, the transparent plate member includes a rod lens array consisting of a plurality of rod lenses, each of the rod lenses having a parabolic refractive index distribution with a maximum at an optical axis thereof.

In yet another particular case, the camera further includes a film feeding system capable of feeding a photographing film to a photographing position, or removing the photographing film from the photographing position, the film feeding system removing the photographing film from the photographing position when an image is to be captured by the imaging device.

In this case, the photographing film may be a roll film accommodated in a cartridge and the film feeding system may retract the film in the cartridge when the film is retracted from the photographing position.

In yet another particular case, the camera further includes a manually operable switch and a rewinding system for rewinding a photographing film loaded in the camera, the rewinding system rewinding the photographing film in response to operation of the switch.

In yet another particular case, the camera further includes: a manually operable selector which is used for selecting one of a first operation mode or a second operation mode, a photographing film being used when the camera operates in the first mode, the imaging device being used when the camera operates in the second mode; and a film feeding system capable of feeding or rewinding the photographing film, the film feeding system operating in accordance with selection made by the selector.

In this case, when the film is present at a photographing position and the first mode is selected by the selector, the feeding system does nothing.

Also in this case, when the film is not present at a photographing position and the first mode is selected by the selector, the feeding system feeds the film such that an unexposed photographing frame is moved to the photographing position.

Further, when the film is present at a photographing position and the second mode is selected by the selector, the feeding system rewinds the film such that the film is not at the photographing position.

Still further, when the film is not present at a photographing position and the second mode is selected by the selector, the feeding system does not feed or rewind the film.

DETAILED DESCRIPTION OF THE PREFERRED EMBODIMENTS

Figure 1:
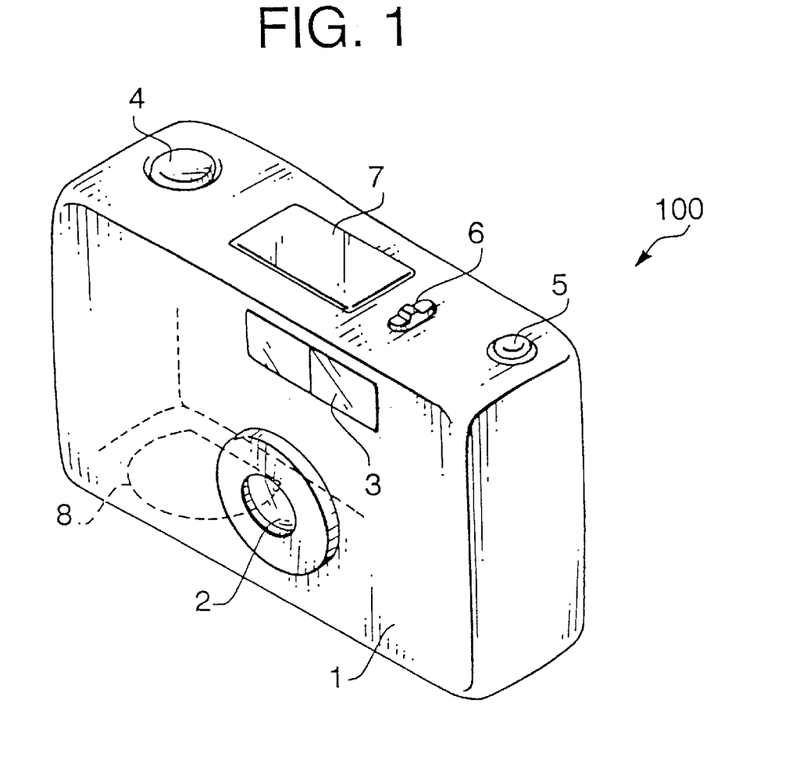
FIG. 1 is a perspective view of a camera embodying the invention.
Figure 2:
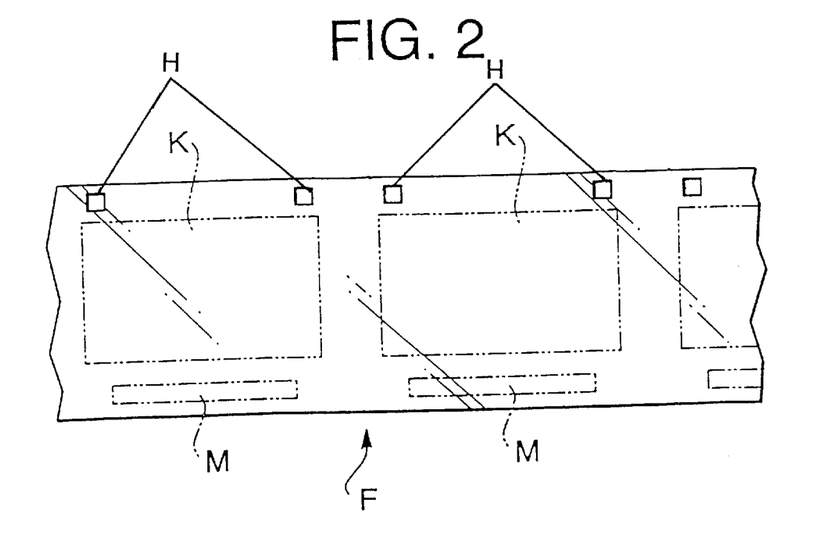
FIG. 2 shows an APS film used in the camera shown in FIG. 1.
Figure 3:
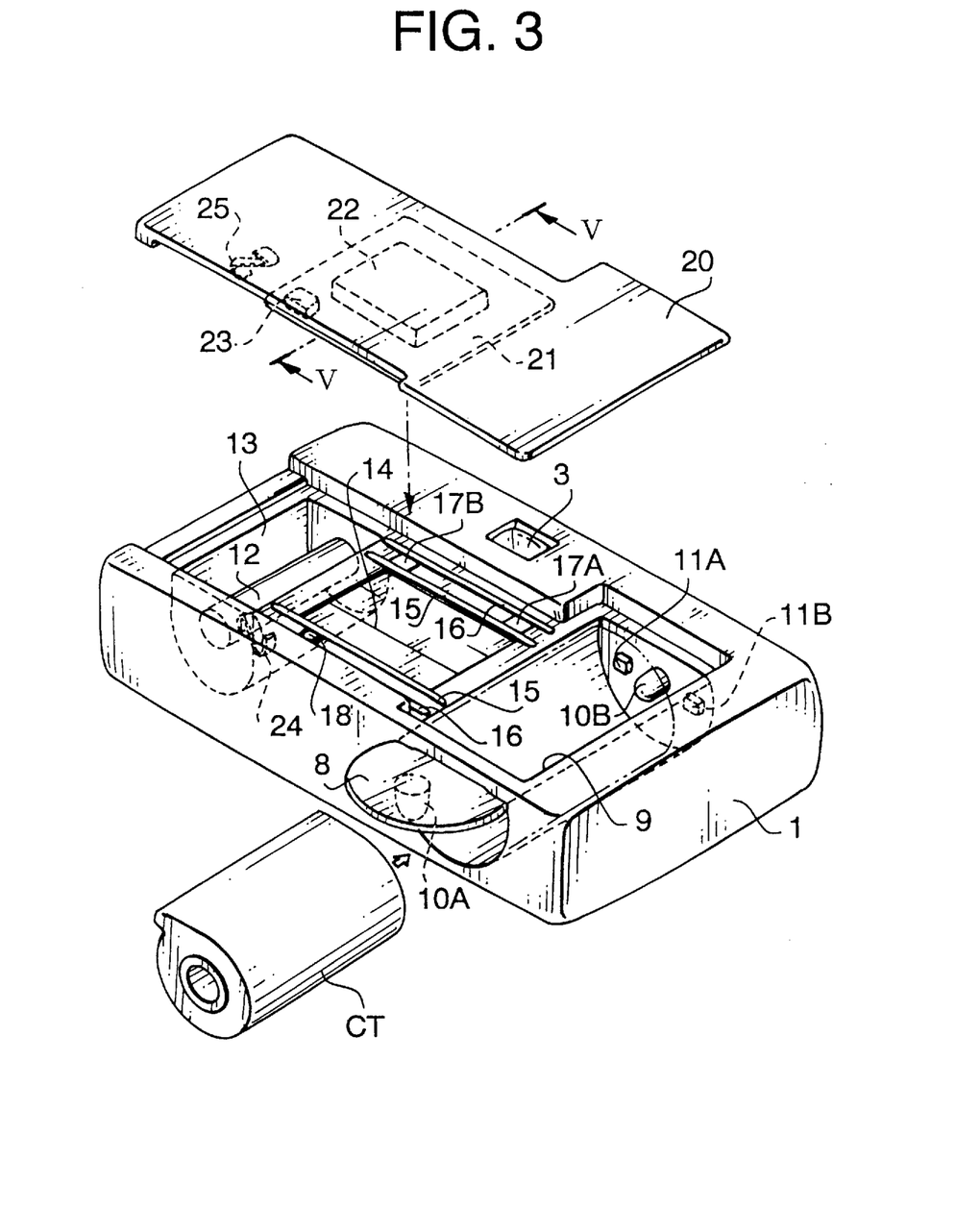
FIG. 3 is a partially exploded perspective rear view of the camera.

FIG. 1 is a perspective view of a camera 100 embodying the invention. FIG. 2 shows an APS film used in the camera 100 shown in FIG. 1. FIG. 3 is a partially exploded perspective rear view of the camera 100. The camera 100 is operable in both a normal photographing mode using the APS film and a digital photographing mode for obtaining electronic image data using an imaging device.

The camera 100 is a so-called lens shutter camera, and uses an APS film as a silver halide film.

The camera 100 has a camera body 1 which is relatively small and thin. A photographing lens 2 is provided at a central portion of a front surface of the camera body 1. Above the photographing lens 2, a view finder (an optical view finder) 3 is provided. On an upper surface of the camera body 1, various switches such as a release button 4, a main switch 5, a mode selection switch 6 and the like are provided. At a central portion of the upper surface, an LCD unit 7 is provided.

As shown in FIG. 3, one side in the camera body 1 is formed to be a cartridge chamber 9, and on a lower surface of the camera body 1, a hinged cover 8 is provided. By opening the hinged cover 8 as shown in FIG. 3, a film cartridge CT accommodating the APS film is inserted inside the camera body 1.

On an inner surface of the hinged cover 8, and on an upper surface of the film chamber 9 (i.e., on inner surfaces of the camera body 1 facing the ends of the film cartridge CT,) spool drivers 10A and 10B are provided, respectively. The spool drivers 10A and 10B engage with a spool (not shown) of the film cartridge, and are used for supporting the film cartridge in place and feeding the APS film.

On the upper surface of the cartridge chamber 9, a pair of film information detectors 11A and 11B are provided. The film information detectors 11A and 11B read a bar code or the like provided on a surface of the film cartridge CT. On the other side of the camera body 1, a film winding unit 13 is provided. The film winding unit 13 has a winding spool 12 on which the APS film fed from the film cartridge CT is wound.

Between the cartridge chamber 9 and the film winding unit 13, a photographing aperture 14 is formed. The photographing aperture 14 defines a picture frame on the film. Outside the aperture frame 14, a pair of inner rails 15 and outer rails 16 extending along longitudinal sides of the aperture frame 14 are provided. The inner and outer rails 15 and 16 are used for guiding the film.

Between the inner rail 15 and outer rail 16 provided on an upper side of the aperture 14 ("upper" defined when the camera is oriented to photograph a landscape picture,) a pair of reflection-type photosensors 17A and 17B are provided. The photosensors 17A and 17B are arranged along a film feed direction, the photosensor 17A on the cartridge chamber side, and the photosensor 17B on the film winding unit side, as shown in FIG. 3. The photosensors 17A and 17B are used for detecting holes H provided along one side of the APS film at predetermined intervals.

Between (lower) the inner rail 15 and (lower) the outer rail 16 provided on a lower side of the aperture 14, a pad 18 is provided. The pad 18 is used for pressing a magnetic recording surface formed on a back surface of the APS film F to contact a magnetic head 23 (described below).

The APS film F is formed such that a photosensitive layer (frame K) is formed on a front surface and a magnetic recording layer is formed on the entire back surface. Areas of the magnetic recording layer which contact the magnetic head 23 when the film is wound or rewound are defined as tracks M (see FIG. 2). In this embodiment, the track M is a rectangular area as shown in FIG. 2, and is located on opposite side of the frames K with respect to the holes H.

A back cover 20 is integrally formed on a rear side of the camera body 1. On an inner surface of the back cover 20, a pressure plate 21 is supported. A front surface of the pressure plate 21, is press contacted with the outer rails 16 when the back cover 20 is secured to the camera body 1. The outer rails 16 protrude slightly further towards the back cover 20 than the inner rails 15. When the pressure plate 20 is press contacted with the outer rails 16, a clearance is formed between the inner rails 15 and the surface of the pressure plate 20. The APS film F is fed through the clearance formed between the inner rails 15 and the pressure plate 21. Note that, with this status, the clearance is very small and the APS film F is almost press contacted to the inner rails 15. Accordingly, the APS film F facing the photographing aperture 14 is held in a flat plane.

Behind the pressure plate 21, i.e., between the pressure plate 21 and the back cover 20, a CCD image pickup (charge coupled device) 22 is provided. When the APS film F is not loaded in the camera 100, light from an object passes through the aperture 14 and forms an image of the object on the CCD 22.

On the pressure plate 21, at a position corresponding to the track M, the magnet head 23 is provided. When the APS film moves, the magnet head 23 is press contacted with the APS film F by the pad 18.

In the camera body 1, a film feeding unit 30 is built in. The film feeding unit 30 thrusts the APS film F from the film cartridge CT, feeds the tip of the APS film F to the film winding unit 13, and drives the film winding unit 13 to wind the APS film F (by rotating the spool 12). Further, the film feeding unit 30 is able to rewind an APS film F wound around the spool 12 to return to the cartridge CT.

A spool pressing leaf 24 and a film pressing leaf 25, respectively made from resilient plate, are provided in the neighborhood of the film winding unit 13. One end of the spool pressing leaf 24 is secured to the camera body 1, and one end of the film pressing leaf 25 is secured to the back cover 20. The spool pressing leaf 24 and the film pressing leaf 25 support the winding and rewinding operations of the APS film F.

Figure 4:
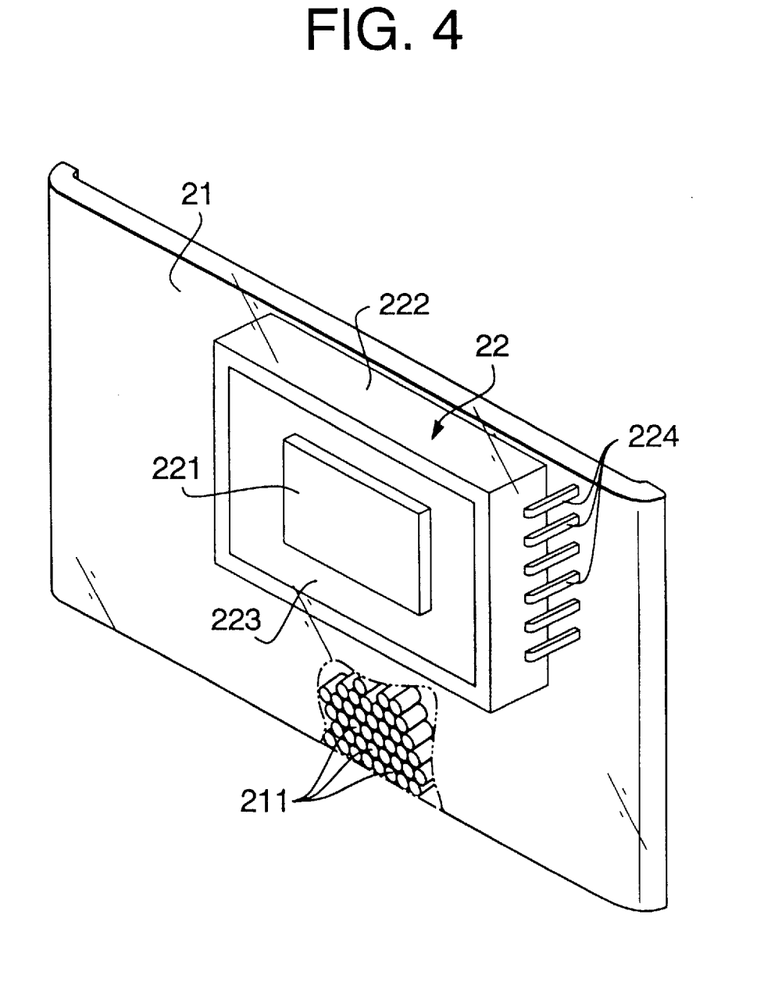
FIG. 4 shows a structure of a pressure plate and a CCD.
Figure 5:
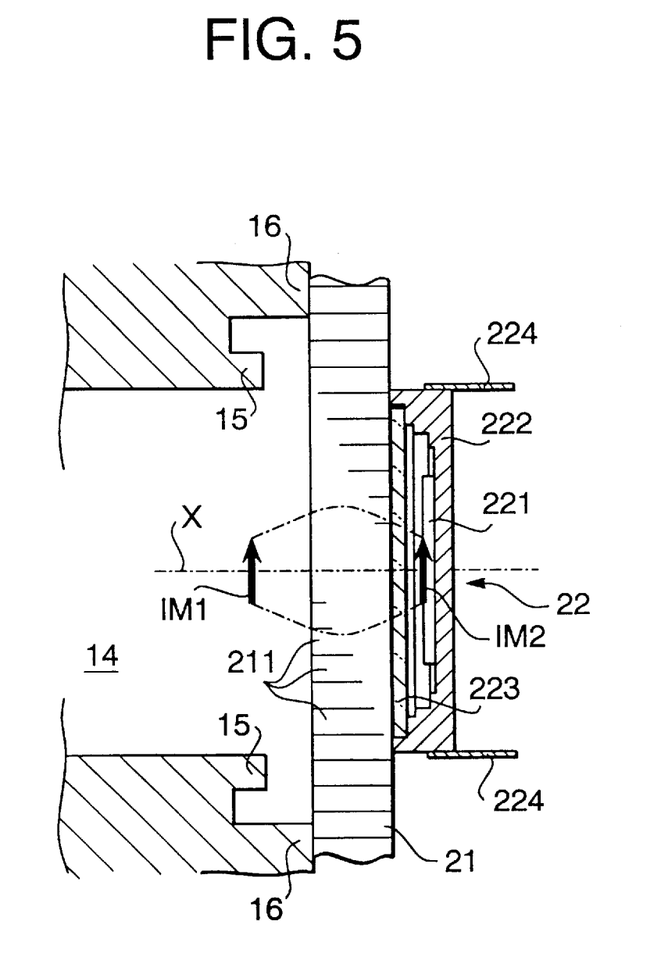
FIG. 5 shows a cross section taken along a line V—V of FIG. 3.

FIG. 4 shows a structure of the pressure plate 21 and the CCD 22. FIG. 5 shows a partial cross section of the camera 100 taken along a line V—V of FIG. 3.

As shown in FIGS. 4 and 5, the pressure plate 21 is formed from a plate-like rod lens array including a plurality of rod lens elements 211. The rod lens elements 211 are two-dimensionally arranged such that the optical axes thereof are perpendicular to the plane in which the rod lens elements 211 are arranged.

Figures 6A, 6B:
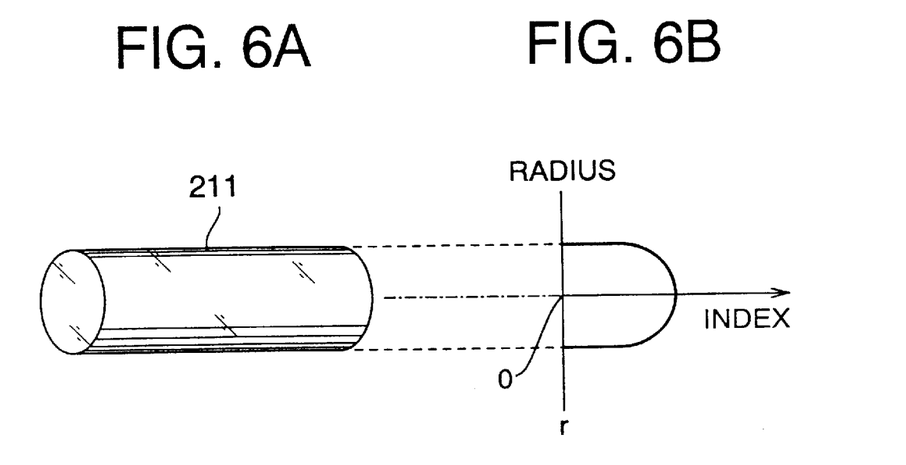
FIG. 6A shows an element of a rod lens array forming the pressure plate.
FIG. 6B shows a distribution of the index of refraction for the element shown in FIG. 6A.

FIG. 6A shows a rod lens element 211 and FIG. 6B is a graph showing a refractive index distribution for the rod lens element 211. The rod lens element 211 is a gradient index lens. Specifically, as shown in FIG. 6B, the rod lens element 211 has a parabolic refractive index distribution with a maximum along the optical axis thereof. An example of such a rod lens element 211 is a "SELFOC lens array" manufactured by Japan Plate Glass Kabushiki Kaisha.

Figure 6C:
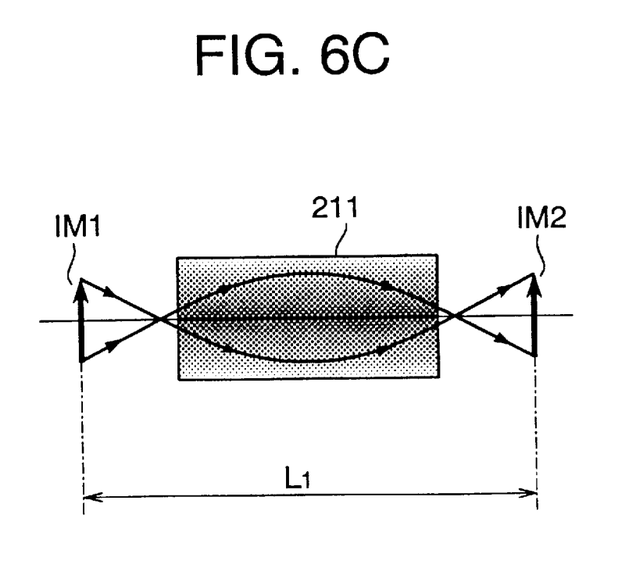
FIG. 6C is a diagram illustrating a principle of light transmission in the rod lens array.

The function of this type of gradient index rod lens 211 is illustrated in FIG. 6C. By using the rod lens 211, a light beam incident on the incident side surface proceeds through the lens, and is emitted from the other side surface. By setting the length of the rod lens appropriately, an image IM1 formed in front of the rod lens element 211 (in this case in front of the pressure plate 21) is re-focused on a predetermined position on the rear side of the pressure plate 21 as an erect image IM2. Thus, an image can be shifted, by an amount L1, from the position of the image IM1 to the position of the image IM2.

Behind the pressure plate 21, the CCD 22 is fixedly secured on the back cover 20. The CCD 22 includes a CCD element 221 which is exposed to the photographing aperture 14 through the pressure plate 21. Any one of various types of CCDs can be used. As an example, in this embodiment, the CCD 22 includes a resin package 222 in which the CCD element 221 is mounted and sealed with a cover glass 223 as shown in FIG. 5. The CCD element 221 is electrically connectable through lead lines 224 supported by the package 222.

Light from the object passes through the photographing lens 2 and passes through the photographing aperture 14. When the film is loaded in the camera body 1, the image of the object is formed on the film F. On the other hand, if the film F is not loaded in the camera body 1, the light further passes through the pressure plate 21 (i.e., the rod lens array), and the image of the object is formed on the CCD element 221.

As shown in FIG. 5, an image IM1 of the object is formed on a plane (which coincides with the surface of the film if the film were loaded) in front of the pressure plate 21. Then, by the function of the rod lens array described above, the image IM2 is formed on the surface of the CCD element 221. Thus, it is not necessary to switch the focusing operation of the lens system depending on whether the camera 100 operates in the normal photographing mode or the digital photographing mode. It should be noted that no further circuits or structures are necessary, and thus the structure of the camera 100 is not complicated.

Figure 7:
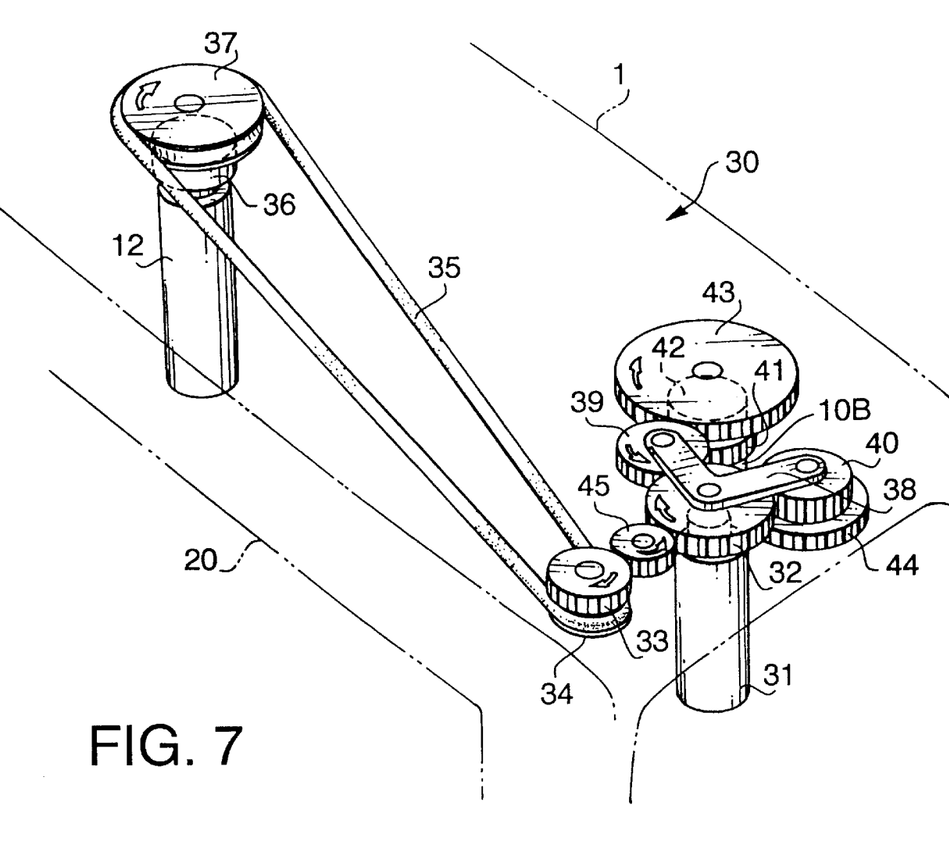
FIG. 7 is schematic perspective view of a film winding structure.

FIG. 7 is schematic perspective view of a film feeding unit 30 viewed from an upper right rear side of the camera 100. The film feeding unit 30 includes a driving motor 31. On an output shaft of the driving motor 31, a driving gear 32 is secured. By way of an idling gear 45, the driving gear 32 is connected to a first driven gear 33. A first pulley 34 is coaxially fixed to the first driven gear 33. A belt 35 is wound around the first pulley 34. The belt 35 is also wound around a second pulley 37 which is coaxially fixed to the winding spool 12 through a one way clutch 36.

To the drive gear 32, a second driven gear 39 and a third driven gear 40 are engaged, the second and the third driven gears 39 and 40 are rotatably supported at either end of a rockable arm 38.

When the rockable arm 38 is rotated clockwise as shown in FIG. 7, the second driven gear 39 engages a driver gear 43 coaxially fixed to the spool driver 10B through a reverse gear 41 and a one way clutch 42. The driving force of the drive motor 31 is transmitted, as indicated by arrows, through the driving gear 32, the second driven gear 39, the driver gear 43, the one way clutch 42, and finally the reverse gear 41 to the spool driver 10B. As a result the spool driver 10B is rotated forwardly. Thus, the APS film is thrust from the cartridge CT and wound around the spool 12.

It should be noted that due to a difference of diameters of the first pulley 34 and the driver gear 43, the winding spool 12 rotates faster than the spool driver 10B. Therefore, after the tip of the film is caught by the winding spool 12, the film is wound by the rotation of the winding spool 12. In this case, a difference of the rotation of the winding spool 12 and the spool driver 10B is absorbed as the one way clutch 42 idles.

When the rockable arm 38 rotates counterclockwise, the second driven gear 39 is released from the driver gear 43, and a gear 44, coaxially and integrally fixed to the third driven gear 40, engages the reverse gear 41. Thus, the spool gear 10B is reversely rotated to retract (rewind) the APS film F from the winding spool 12 to the cartridge CT. In this case, the one way clutch 36 idles such that free rotation of the winding spool 12 is allowed, and rewinding of the film by the spool driver 10B is enabled.

During the winding or rewinding operation, a position of the film is detected by the photosensors 17A and 17B. As shown in FIG. 2, the pair of holes H corresponding to the photographing frame K are separated from each other by a first predetermined interval, and each pair of holes H is arranged at a second predetermined interval. The photosensors 17A and 17B are arranged along the film feeding direction, and the interval therebetween is the same as the first predetermined interval. Accordingly, every time a photographing frame K faces the photographing aperture 14, the photosensors 17A and 17B simultaneously detect a pair holes H corresponding to the facing frame K. By controlling the driving motor 31 in accordance with the detection results of the photosensors 17A and 17B, the film position can be controlled appropriately.

Figure 8:
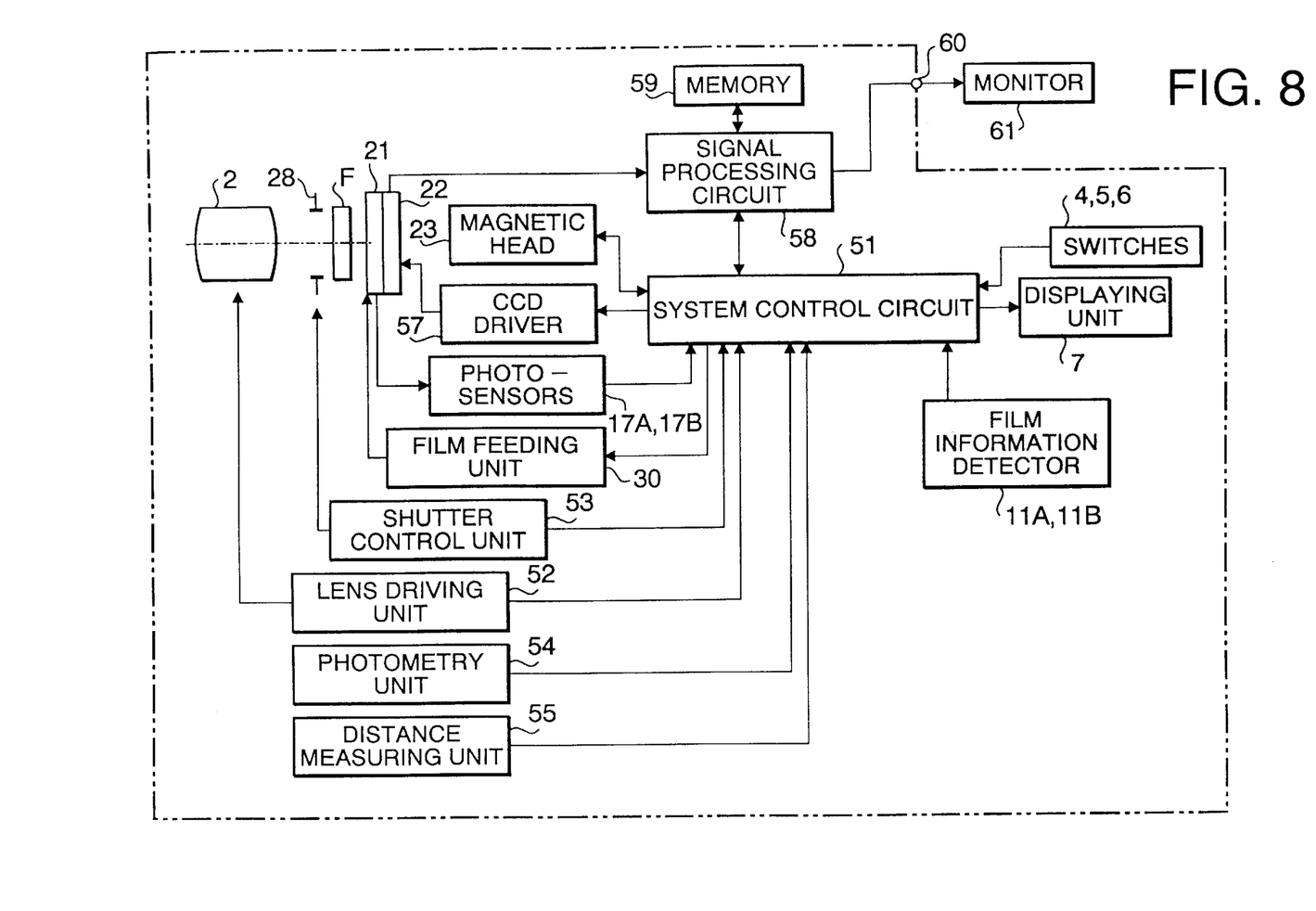
FIG. 8 is a block diagram illustrating a control system of the camera shown in FIG. 1.

FIG. 8 is a block diagram illustrating a control system of the camera 100. The camera 100 has a system control circuit 51 (including a CPU) that controls the camera 100. The system control circuit 51 is connected with a lens driving unit 52 for driving a lens system of the lens unit 2 to perform a zooming operation and/or a focusing operation, a shutter control unit 53 which drives a shutter 26 included in the lens unit 2, a photometry unit 54, and a distance measuring unit 55. In this embodiment, the shutter 26 also functions as an aperture unit for controlling an amount of light entering the image forming region (film F or CCD 22 surface). The photometry unit 54 and the distance measuring unit 55 function when the release button 4 is operated and a photographing operation is executed.

The system control circuit 51 is further connected with the photosensors 17A and 17B, the magnetic head 23 for reading/recording information on the magnetic recording layer of the APS film, the film information detectors 11A and 11B for reading information formed on the cartridge CT, the various switches 4, 5 and 6, and the display unit 7.

Further, a driver 57. for driving the CCD 22 and a signal processing circuit 58 for receiving and processing an image signal output from the CCD 22 are connected to the system control circuit 51. An output signal of the signal processing circuit 58 is stored in a memory 59 built in the camera body 1. The output signal of the signal processing circuit 58 may be output through an output terminal 60.

The output terminal 60 may be connected to, for example, an external recording device or the like to store the output signal. Alternatively, or in addition, as shown in FIG. 8, a monitor 61 may be connected to the output terminal 60.

In the camera 100, when normal photographing is performed, the film cartridge CT accommodating the APS film F is inserted in the film chamber 9. The APS film is then automatically drawn from the cartridge CT and wound by the feeding unit 30, such that a frame K faces the photographing aperture 14. In this condition, when an operator depresses the release button 4, the frame K is exposed to light (i.e., the image of the object is formed and exposed on the frame K). Then film is then fed by one frame so that the subsequent photographing is performed.

If the camera 100 is used for capturing an electronic image, the pressure plate 21 directly contacts the outer rails 16 since the film is not loaded in the camera 100. The CCD element 221 of the CCD 22 faces the aperture through the transparent pressure plate 21 and cover glass 223. Due to the function of the rod lens array as described above, the image is formed on the CCD element 221, and accordingly the electronic image can be obtained.

It should be noted that in accordance with the APS system, it is possible to rewind the film even if all the frames have not been exposed, and then feed the film again such that an unexposed frame is located at the aperture 14 so that photographing can be executed. Therefore, even if the film is loaded in the camera 100, the camera 100 can be used for digital photographing using the CCD 22 film. If it is necessary to continue normal photographing after digital photographing is executed, the film can be fed such that subsequent photographing can be executed without unintentional multiple exposures.

Figure 9:
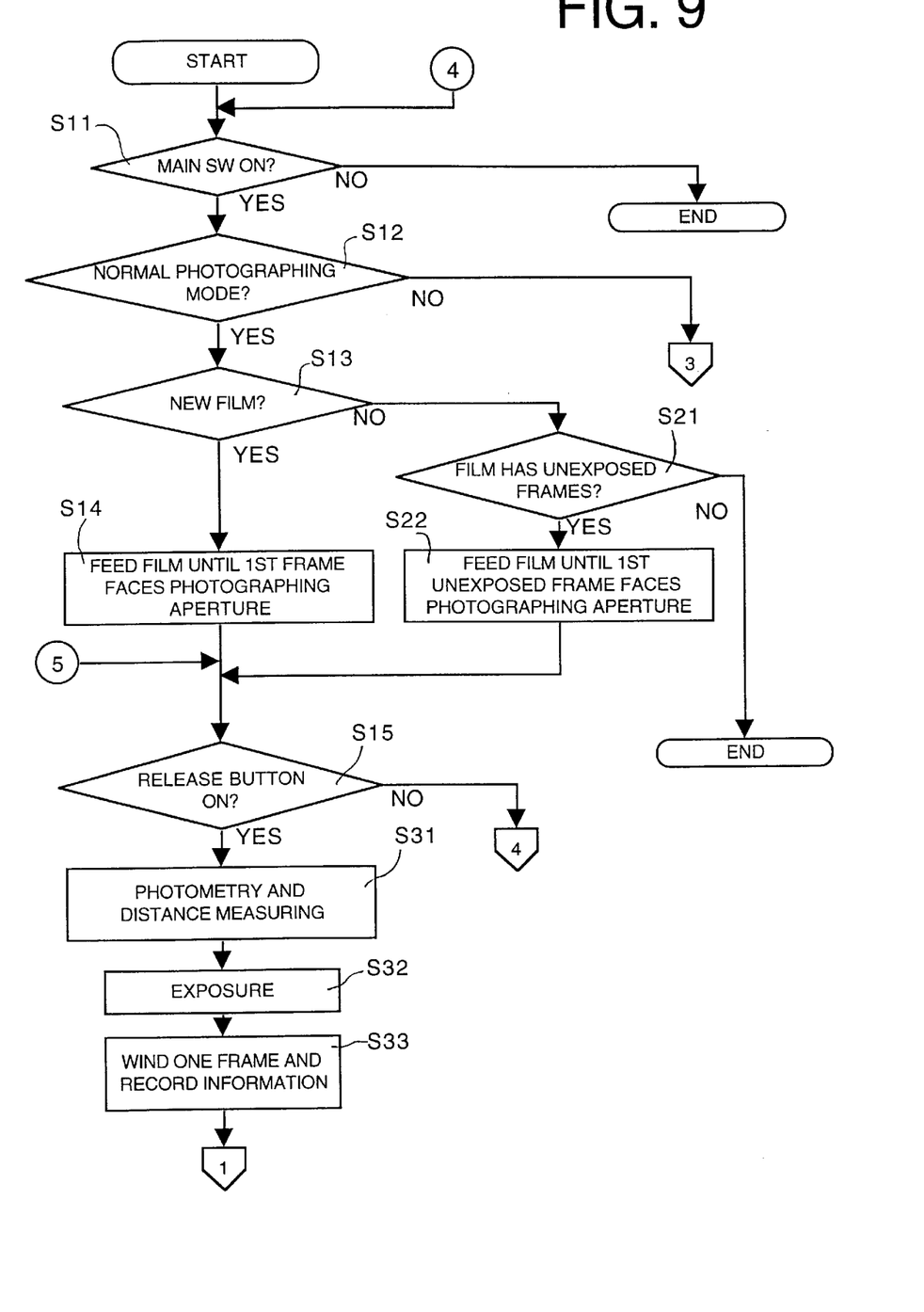
FIGS. 9, 10, and 11 show a flowchart of operation of the camera shown in FIG. 1.
Figure 10:
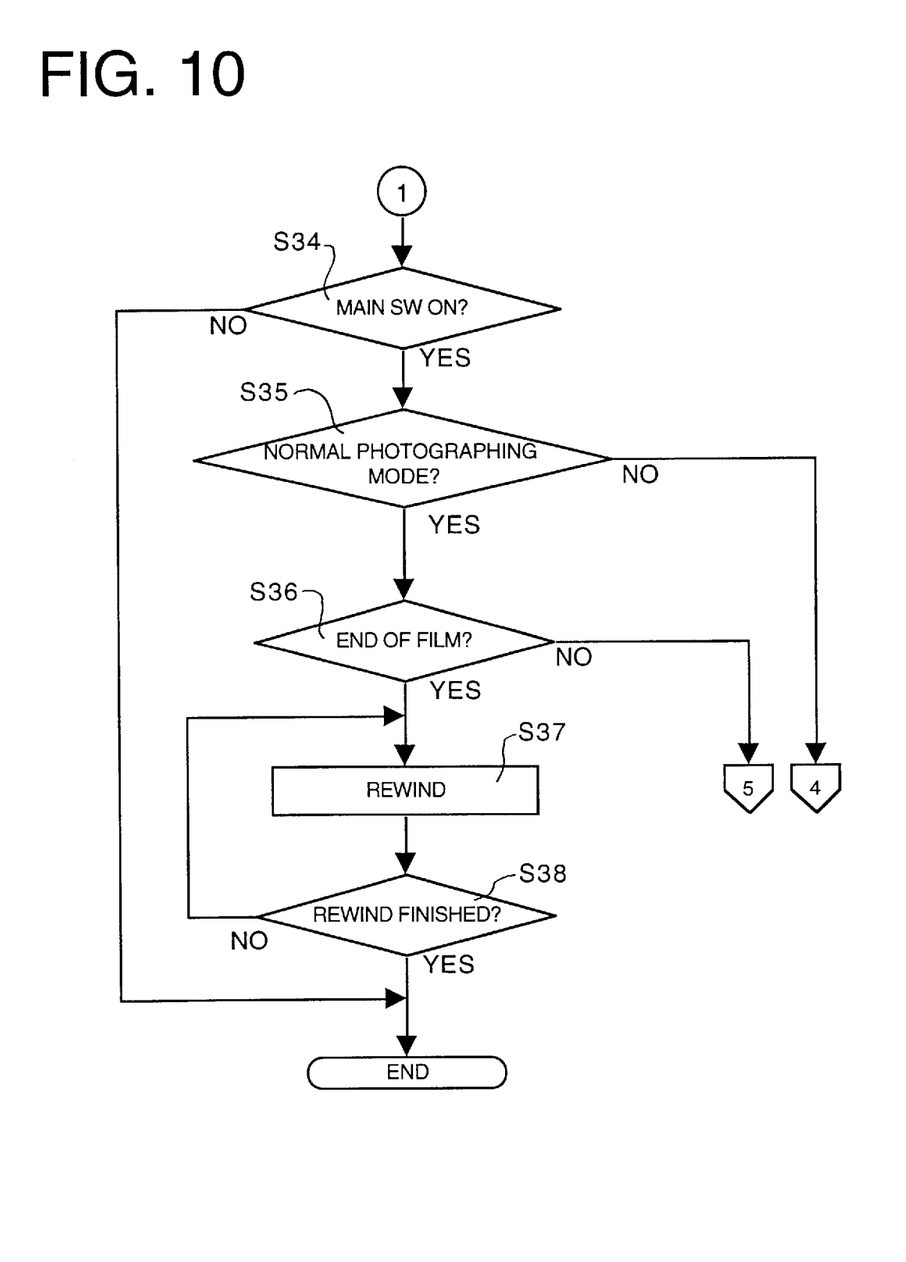
Figure 11:
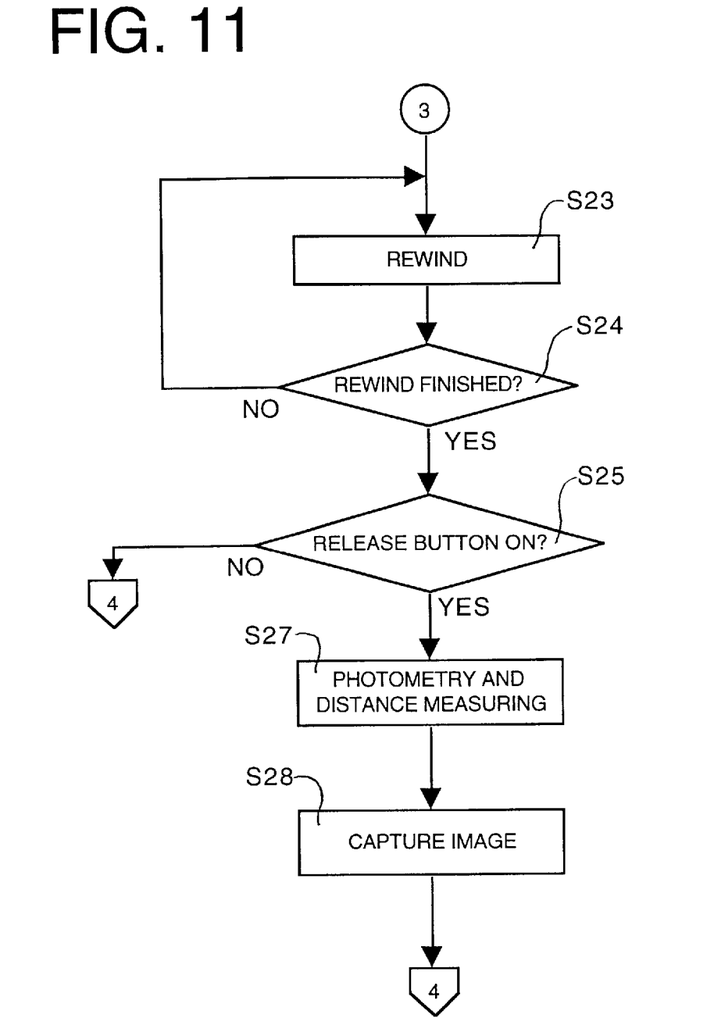

FIGS. 9, 10, and 11 show a flowchart of operation of the camera 100. As shown in FIG. 9, when the main switch 5 is turned ON (S11), the system control circuit 51 determines whether normal photographing or digital photographing is selected based on the status of the mode selection switch 6 (S12). If normal photographing is selected (S12:YES), control proceeds to step S13, where it is determined whether the APS film F inserted in the cartridge chamber 9 is new film, based on the film information detector 11 (S13).

If the loaded film is a new film (i.e., having no exposed frames) (S13:YES), then the system control circuit 51 controls the film feeding unit 30 to fed the film such that the first frame faces the photographing aperture 14 (S14). As described before, the position of the film can be detected by the photosensors 17A and 17B. Control then proceeds to step S15.

If the loaded film is not a new film, but has unexposed frames (S13:NO; S21:YES), the system control circuit 51 controls the film feeding unit 30 to feed the film such that the first unexposed frame faces the photographing aperture 14 (S22). Control then proceeds to S15.

If the loaded film does not have unexposed frames (S13:NO; S21:NO), the process ends. It should be noted that in either of steps S14 or S22, if the unexposed frame is already facing the photographing aperture, no feeding operation is executed.

In step S15, it is determined whether the release button 4 is ON. If the release button 4 is not ON (S15:NO), control returns to S11. If the release button 4 is ON (S15:YES), then the photometry unit 54 and the distance measuring unit 55 are driven to measure the brightness of the object and the a distance to the object, and the focusing lens is driven to form an in-focus image (S31). The shutter control unit 53 is then controlled to drive the shutter 26 to perform an exposure operation in accordance with the measured brightness of the object (S32). After the exposure operation is finished, the film is fed by one frame and information is recorded on the magnetic strip M (S33).

As shown in FIG. 10, in step S34, the system control circuit 51 determines whether the main switch 5 is turned ON or OFF (S34). If the main switch 5 is ON (S34:YES), the system control circuit 51 determines whether the normal photographing mode or the digital photographing mode is selected (S35). If the normal photographing mode is not selected (S35:NO), control returns to step S11.

If the normal photographing mode is selected (S35:YES), it is determined whether all the frames have been exposed (S36) based on the number of holes H detected by the photosensors 17A and 17B and the information from the film cartridge CT detected by the film information detectors 11A and 11B. If all the frames have been exposed to light, i.e., if no photographable (as yet unexposed) frames remain (S36:NO), the film control unit 30 is driven to completely rewind the film F (S37). Rewinding continues until finished as monitored at step S38. When rewinding is finished (S38:YES), the process ends.

If, in step S12, it is determined that the digital photographing mode is selected (S12:NO), then, as shown in FIG. 11, the film loaded in the camera 100 is completely rewound (S23 and S24). It should be noted that if the film is not loaded in the camera 100, the rewinding operation at steps S23 and S24 is skipped. After rewinding is finished (S24:YES), it is determined whether the release button 4 is ON (S25). If the release button 4 is not ON (S25:NO), control returns to step S11. If the release switch 4 is ON (S25:YES), the photometry unit 54 and the distance measuring unit 55 are driven to measure brightness of the object and a distance to the object, and the focusing lens is driven to form an in-focus image (S27). The shutter control unit 53 is then controlled to drive the shutter 26 and the CCD 22 to perform an image capturing operation in accordance with the measured brightness of the object (S28). After the image capturing operation is finished, the process returns to step S11.

As described above, according to the camera 100, when the film is loaded, the camera is operable in the normal photographing mode, in which the camera operates in a similar manner to a conventional camera using the APS film. Further, the digital photographing mode may be selected regardless of whether a film is loaded in the camera 100. If the film cartridge CT is inserted in the camera 100 but the film is not loaded, (i.e., wound on the winding spool 12) the camera 100 is operable in the digital photographing mode as is. If the film is loaded, the loaded film is automatically rewound, and the camera is then ready for operating in the digital photographing mode. In either case, no further operation such as an adjustment of focusing condition is necessary, since the image formed by the photographing lens unit 2 is shifted onto the CCD 22 by the rod lens array in the transparent pressure plate 21. With this structure, the amount of light is not reduced since the light passed through the photographing lens is not split or distributed between normal and digital systems. Further, since a switching system for switching the light path is not used, the structure remains simple, and the camera can be made compact.

Figure 12:
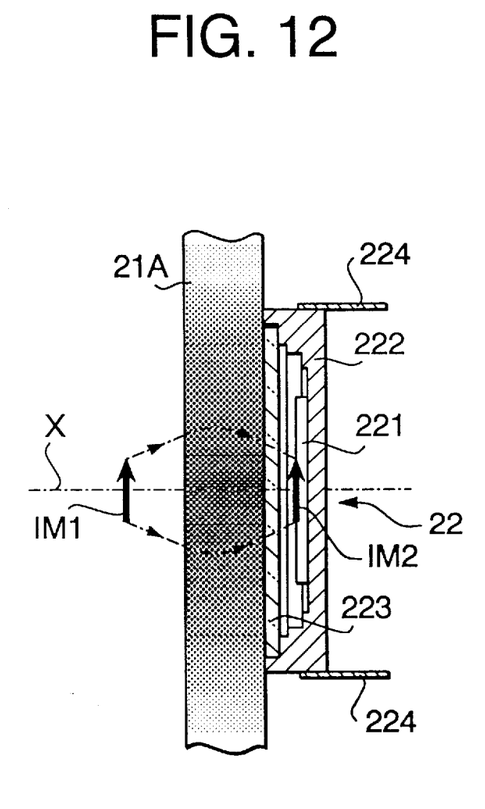
FIG. 12 shows a modified pressure plate.

In the above described embodiment, the pressure plate 21 is formed of a rod lens array. An alternative pressure plate 21A is shown in FIG. 12. In this alternative, the pressure plate 21A is made of a transparent resin (gradient) plate whose refractive index is maximum at the center (around the optical axis) thereof, the refractive index gradually reducing according to a distance from the optical axis X. With this structure, similar to the rod lens array, the image IM1 formed in front of the pressure plate 21A is projected as an in-focus image IM2 on the CCD element 221. The pressure plate 21A may be manufactured more easily than the pressure plate 21 formed of the rod lens array.

In the above described embodiment and alternative, the camera 100 is described as a camera using APS film system. Accordingly, it is possible to completely rewind the film automatically when the digital photographing mode is selected. However, even in a camera which does not use APS film system, e.g., if the rewinding is performed manually, if a structure similar to that of the transparent pressure plate and CCD described herein is used, the invention is applicable.

In the embodiment, as shown in the figures, the image receiving area of the CCD element 221 is relatively small with respect to the photographing frame K. Therefore, if the magnification of the view finder or 3 the size of the CCD element 221 does not compensate for the difference between the sizes of the CCD element 221 image receiving area and the frame K, it is preferable to provide an indication in the view finder that indicates the image capturing area when the digital photographing is executed. Alternatively, the magnification of the view finder 3 may be when the digital mode is enabled so that the field of view of the view finder 3 coincides with the image capturing area of the CCD element 221. Further alternatively, the camera 2 may use a CCD element 221 which covers the area of the photographing frame K.

In the above-described embodiments, the image signal is output through the terminal 60 to the external monitor 61. When the camera 100 is provided with an integral display device such as an LCD, the captured image may be displayed on the display device when the digital photographing mode is selected. In such a case, e.g., when the camera 100 operates in the normal photographing mode, the optical view finder 3 is used, and when the camera 100 operates in the digital photographing mode, either the optical view finder 3 or the display device may be used as a finder.

As described above, the CCD element 221 is arranged behind the transparent pressure plate 21 and, if the film F is retracted from the photographing aperture 14, the image formed by the photographing lens 2 is projected onto the imaging device 221. With use of the rod array or the plate member having the predetermined gradient index property 21A, the in-focus image of an object can be formed on the CCD element 221 without any additional mechanism or logic circuits. Further, with this structure, the amount of light is not reduced and sufficient brightness can be obtained. Furthermore, since no mechanism for switching the optical path is needed, the camera 100 can be made compact and the manufacturing cost may be kept lower.

The present disclosure relates to subject matters contained in Japanese Patent Applications No. HEI 08-232808, filed on Sep. 3, 1996, and No. HEI 09-187088, filed on Jul. 14, 1997, which are expressly incorporated herein by reference in their entireties.

What is claimed is:

1. A camera, comprising:
   a photographing lens;
   an image device having an image receiving plane, said imaging device receiving an optical image formed on said image receiving plane and outputting a signal corresponding to the received image; and
   a pressure plate arranged between the photographing lens and said imaging device, said pressure plate being formed of a transparent plate member having a predetermined gradient distribution of refractive index, said pressure plate shifting an image formed in front of said pressure plate to form on the image receiving plane of said imaging device.

2. The camera according to claim 1, wherein said transparent plate member comprises a resin plate, said predetermined distribution of the refractive index having a maximum refractive index at a portion where an optical axis of said photographing lens intersects said resin plate, and said predetermined distribution of refractive index decreasing away from said portion where said optical axis intersects said resin plate.

3. The camera according to claim 1, wherein said transparent plate member comprises a rod lens array including a plurality of rod lenses, each of said rod lenses having a parabolic refractive index distribution with a maximum at an optical axis of the rod lens.

4. The camera according to claim 1, further comprising a film feeding system that feeds a photographing film to a photographing position intervening between said imaging device and said photographing lens and that removes said photographing film from said photographing position, said film feeding system removing the photographing film from said photographing position when an image is to be captured by said imaging device.

5. The camera according to claim 4, wherein said photographing film is a roll film accommodated in a cartridge, said film feeding system retracting said film into said cartridge when said film is retracted from said photographing position.

6. The camera according to claim 1, further comprising a manually operable switch; and a rewinding system for rewinding a photographing film loaded in said camera, said rewinding system rewinding said photographing film in response to operation of said manually operable switch.

7. The camera according to claim 1, further comprising:
   a manually operable selector for selecting one of a first operation mode or a second operation mode, a photographing film intervening between said photographing lens and said imaging device and being exposed at a photographing position when said camera operates in said first operation mode, said imaging device acquiring an image when said camera operates in said second operation mode; and a film feeding system that feeds and rewinds said photographing film, said film feeding system operating in accordance with a selection made by said selector.

8. The camera according to claim 7, wherein when said photographing film is present at the photographing position and said first operation mode is selected by said manually operable selector, said feeding system is idle.

9. The camera according to claim 7, wherein said photographing film is not present at the photographing position and said first operation mode is selected by said manually operable selector, said feeding system feeds said photographing film until an unexposed photographing frame of said photographing film is moved to said photographing position.

10. The camera according to claim 7, wherein when said photographing film is present at the photographing position and said second operation mode is selected by said manually operable selector, said feeding system rewinds said photographing film until said photographing film is not present at said photographing position.

11. The camera according to claim 7, wherein when said photographing film is not present at the photographing position and said second operation mode is selected by said manually operable selector, said feeding system maintains the position of said photographing film.

12. The camera according to claim 1, wherein a rear surface of said pressure plate formed of a transparent plate member having a predetermined gradient distribution of refractive index is separated from and does not contact said image receiving plane of said imaging device.

* * * * *